UNITED STATES PATENT OFFICE.

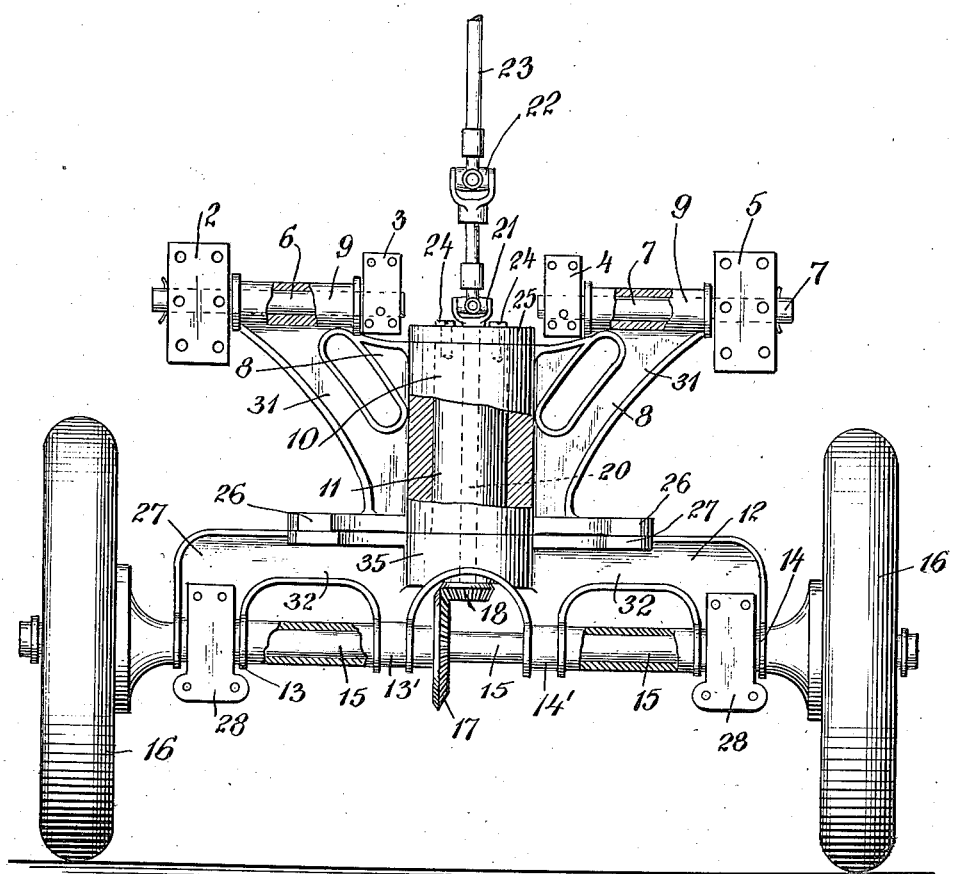

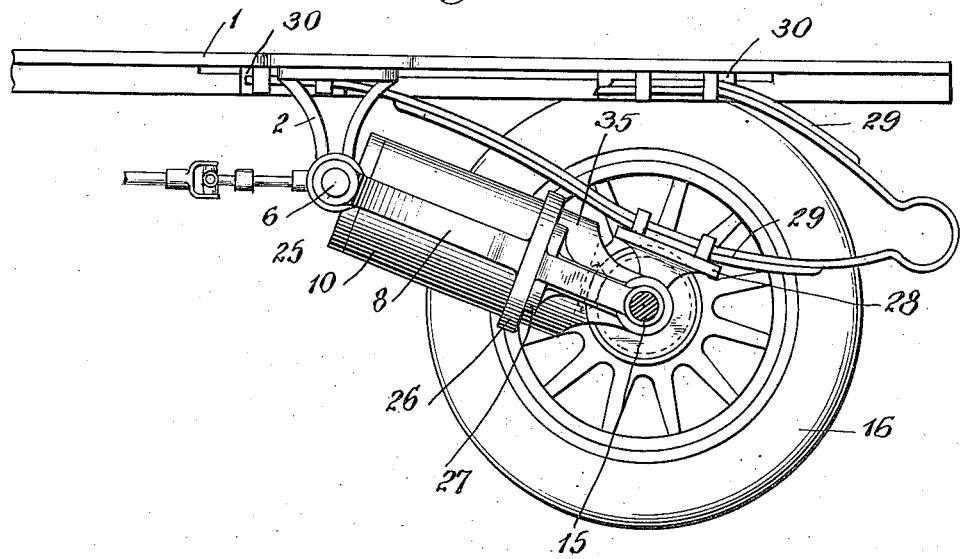
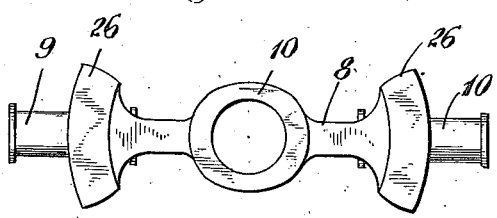
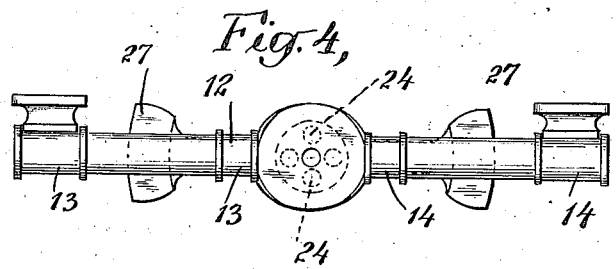

CHARLES W. VAN VLEET, OF SAUGERTIES, NEW YORK, ASSIGNOR, BY DIRECT AND MESNE ASSIGNMENTS, OF ONE-THIRD TO JAMES T. MAXWELL AND ONE-THIRD TO ROBERT E. HALEY, BOTH OF SAUGERTIES, NEW YORK.

SPRING SUSPENSION FOR VEHICLES.

1,165,350.      Specification of Letters Patent.      Patented Dec. 21, 1915.

Application filed October 6, 1911. Serial No. 653,105.

*To all whom it may concern:*

Be it known that I, CHARLES W. VAN VLEET, a citizen of the United States, and a resident of Saugerties, county of Ulster, and State of New York, have invented certain new and useful Improvements in Spring Suspensions for Vehicles, of which the following is a specification.

My invention relates to improvements in spring suspensions for vehicles, and is especially designed to relieve the suspension springs in vehicles from all lateral and endwise strains, yet permitting the free action of the spring, as a cushioning device.

One object of my invention is to provide a device of this class, which is simple, strong and efficient, and not liable to get out of order.

A further object of my invention is to provide such a device, which is especially applicable to motor propelled vehicles having suitable transmission gearing in which the wheel carrying axle is rigidly held in position with respect to the transmission apparatus, whereby the transmission apparatus may be more simplified and made more efficient.

Further objects, features and advantages will more clearly appear from the detailed description given below, taken in connection with the accompanying drawings which form a part of this specification.

In the drawings Figure 1 is a plan view of my improvements in one form, the body of the vehicle being omitted, and certain parts being broken away, in order to more clearly illustrate the same. Fig. 2 is a side elevation of parts shown in Fig. 1, showing also a portion of the body frame and the cushioning spring. Fig. 3 is an end view of one of the supplementary frames shown in Fig. 1. Fig. 4 is an end view of the other supplementary frame shown in Fig. 1.

Referring to the various drawings, 1 represents a portion of a frame, or body portion of a motor driven vehicle. Rigidly secured to the rear part of the body portion of the vehicle near the rear or driving axle is a plurality of downwardly extending members 2, 3, 4, and 5. Extending between the members 2 and 3, is a journal pin 6, and extending between the members 4 and 5 is a journal pin 7. Pivotally mounted about the journal pins 6 and 7, is a supplementary frame 8, provided with journal bearings 9, engaging the journal pins 6 and 7, respectively. The pins 6 and 7 extend in a substantially horizontal line, transverse the body of the vehicle, and the frame 8 is provided with a journal bearing 10 at right angles to said line, and in the present instance, in the same plane therewith. Journaled in the bearing 10 is a journal 11, rigidly secured to or integral with a second supplementary frame 12, so that the frame 12 is rotatably or pivotally connected with respect to the frame 8, the pivotal axis being at right angles to the axis about which the frame 8 is pivoted. The frame 12 is provided with journals 13 and 14, in which is journaled an axle 15. Secured to the ends of the axle 15 are the usual supporting wheels 16. Also rigidly secured to the axle 15 is a beveled gear 17, adapted to mesh with a gear 18, which is rigidly secured to a shaft 20, passing through an opening in the journal 11, and connected with a universal joint, as at 21, 22, the universal joint 21, 22, being in turn connected to a shaft 23, which is driven in any well known manner as by a suitable motor.

In order to prevent the frame 12 having any movement in a direction parallel to the axis about which it is pivoted, there is bolted to the end of the journal 11, by means of bolts 24, a cap plate 25. Opposing the cap plate 25 is a collar 35, integral with the frame 12, and bearing against the end of the journal bearing 10, opposite to that upon which the cap plate 25 bears. The frames 8 and 12 are provided with suitable coöperating bearing surfaces carried by the parts 26, 26, and 27, 27, respectively. The frame 12 also has rigidly secured thereto supporting beds 28, to which are secured cushioning devices or springs 29, of any well known sort. The opposite sides of the springs 29 are secured to beds 30, which are slidably mounted on the body portion 1. The frame 8 is laterally reinforced by means of diagonal struts 31, 31, so that it is made amply strong, to resist all side thrusts. The frame 8 is, as will be seen from Fig. 1, pivoted at two points, as at the journal pins 6 and 7, considerably separated from one another, thereby making the device much stronger and more effective. In a similar manner the frame 12 is provided with journal bearings 13—13, and 14—14, considerably separated, and connected by strong struts 32.

In operation, the axle carrying frame 12 is allowed a free up and down motion in order to allow the cushioning device 29 to accomplish its usual function in reducing the effect of shocks upon the vehicle, due to unevenness in the road bed. The axle carrying frame 12 is also allowed oscillating movement due to its being pivotally mounted in the frame 8, so that either one of the wheels 16 may be raised without raising the other, thereby providing a compensating action due to unevenness in the road bed occurring only at one side of the vehicle. The frame 12 and the axle 15 are held rigidly from all movement longitudinally with respect to the vehicle, so that any strains due to the quick starting or stopping of the vehicle, or of a similar nature, do not fall in any way upon the springs 29, or other cushioning devices.

In a like manner since the journals 9 are located near the rear or driving axle and shaft 23 is connected with the shaft 20 by universal connection the frame 12 is held rigid from all sidewise or lateral movement, so that the springs 29 are likewise relieved from all strains due to the load tending to throw the body of the vehicle to one side. The bearing plates 26 and 27 provide for the easy oscillation of the frame 12, with respect to the frame 8, without in any way binding, and they also effectively brace one frame with respect to the other. By making the journal 11 rigid with or integral with frame 12, the device is made much stronger, and by providing the cap plate 25 firmly bolted thereto, the journal 11 is prevented from having any longitudinal movement within the bearing 10, thereby greatly simplifying the apparatus and rendering it much stronger. This also obviates any necessity for a sliding connection in the driving shaft 20 between the universal joints 21—22, and the bevel gears 17 and 18.

From the above it will be clear that I have provided exceptionally simple, durable and efficient apparatus for the suspension of springs in motor operated vehicles, and it will also be clear that it is well adapted to any other class of vehicles.

Although I have described my improvements in great detail and with respect to one particular form, nevertheless I do not desire to be limited to such details, since many changes and modifications may well be made without departing from the spirit and scope of my invention in its broadest aspects.

Having fully and clearly described my improvements, what I claim as new, and desire to secure by Letters Patent, is:

1. In a vehicle the combination of a body portion, a frame pivotally mounted to the body portion about a horizontal transverse axis, a second frame pivotally mounted to the first frame about an axis at right angles to the first mentioned axis, an axle journaled in said second frame parallel to the first mentioned axis, means for preventing the second frame from moving relatively to the first frame in the direction of the second mentioned axis, said frames having opposing bearing surfaces at the end of the first frame near the axle, a shaft journaled in said second frame for driving the axle, said horizontal transverse axis, about which the first mentioned frame is pivoted, being situated at the rear of the vehicle near the driving axle, cushioning means between said second frame and the body portion, a motor driven shaft connected to said last mentioned shaft by a universal joint, and supporting wheels carried by the axle.

2. In a vehicle the combination of a body portion, a frame pivotally mounted to the body portion, a second frame pivotally mounted to the first frame, an axle journaled in said second frame, means for preventing the second frame moving longitudinally relatively to the first frame, said frames having opposing bearing surfaces at the end of the first frame near the axle and a shaft journaled in said second frame for driving the axle, said first mentioned frame being pivoted to the body portion near said driving axle, cushioning means between said second frame and the body portion and supporting wheels carried by the axle.

3. In a vehicle the combination of a body portion, a frame pivotally mounted to the body portion about a horizontal transverse axis, a second frame pivotally mounted to the first frame about an axis at right angles to the first mentioned axis, an axle journaled in said second frame parallel to the first mentioned axis, means for preventing the second frame from moving relatively to the first frame in the direction of the second mentioned axis, and a shaft journaled in said second frame for driving the axle, said first mentioned frame being pivoted to the body portion near said driving axle.

4. In a vehicle the combination of a body portion, a frame pivotally mounted to the body portion about a horizontal transverse axis, a second frame pivotally mounted to the first frame, an axle journaled in said second frame, said frames having opposing bearing surfaces at the end of the first frame near the axle, a shaft journaled in said second frame for driving the axle, said first mentioned frame being pivotally mounted on the body portion at the rear near said driving axle, and cushioning means between said second frame and the body portion.

5. In a vehicle, the combination of a body portion, a frame pivotally mounted with respect to the body portion about an axis extending in a horizontal line transverse the vehicle, a second frame pivotally mounted to the first frame about an axis at right angles to said first mentioned axis, said frames having opposing bearing surfaces at the end of the first frame near the axle, means for preventing the second frame from moving relatively to the first frame in the direction of said second mentioned axis, an axle journaled in said second frame about an axis at right angles to said last mentioned axis, a shaft journaled in said second frame for driving the axle, one or more universal joints connected to said shaft for connecting the same with a prime mover, cushioning means between said second frame and body portion, and supporting wheels carried by said axle.

6. In a vehicle, the combination of a body portion, a frame pivotally mounted to the body portion, a second frame pivotally mounted to the first frame, said frames having opposing bearing surfaces at the end of the first frame nearest the axle, means for preventing said frames from moving relatively to one another along the pivotal axis of the second frame, a wheel-carrying axle journaled in said second frame, a shaft journaled in said second frame for driving the axle, one or more universal joints connected to said shaft for connecting the same with a prime mover, and cushioning means between said second frame and body portion.

7. The combination of the body portion (1), the frame (8), the two journals (6, 7) for pivoting it to the body portion about a horizontal transverse axis, the elongated journal bearing (10) carried by the said frame at right angles to the said axis, the axle 15 carried by the frame 12, the frame (12) having a journal (11) coöperating with the bearing (10), the cap plate (25) for securing the journal (11) in place, said frames having the bearings (26, 27) at the end of the frame (8) near the axle (15) and the driving shaft (20) passing through the journal (11), or their equivalents.

In testimony whereof, I have signed by name to this specification, in the presence of two subscribing witnesses.

CHARLES W. VAN VLEET.

Witnesses:
JOHN HALLENBECK,
FRANK KLEIN.